(12) United States Patent
Dahlin

(10) Patent No.: US 10,509,383 B2
(45) Date of Patent: Dec. 17, 2019

(54) CONTROL SYSTEM FOR OPERATING GRAIN BIN SYSTEMS

(71) Applicant: ISC Companies, Inc., Minneapolis, MN (US)

(72) Inventor: Michael D. Dahlin, Zimmerman, MN (US)

(73) Assignee: ISC Companies, Inc., Minneapolis, MN (US)

( * ) Notice: Subject to any disclaimer, the term of this patent is extended or adjusted under 35 U.S.C. 154(b) by 77 days.

(21) Appl. No.: 15/871,535

(22) Filed: Jan. 15, 2018

(65) Prior Publication Data
US 2019/0219980 A1    Jul. 18, 2019

(51) Int. Cl.
| | | |
|---|---|---|
| *G05B 19/05* | (2006.01) | |
| *F04D 27/00* | (2006.01) | |
| *A01F 25/20* | (2006.01) | |
| *A01F 25/22* | (2006.01) | |
| *F04D 17/16* | (2006.01) | |
| *F04D 19/00* | (2006.01) | |

(52) U.S. Cl.
CPC .......... *G05B 19/05* (2013.01); *A01F 25/2018* (2013.01); *A01F 25/22* (2013.01); *F04D 27/004* (2013.01); *F04D 17/16* (2013.01); *F04D 19/002* (2013.01); *G05B 2219/1171* (2013.01)

(58) Field of Classification Search
CPC ............ G05B 19/05; G05B 2219/1171; A01F 25/2018; A01F 25/22; F04D 27/004; F04D 17/18; F04D 19/002; F04D 17/16; A01D 41/127; H02M 7/493; E21B 43/26
USPC .......................................................... 700/75
See application file for complete search history.

(56) References Cited

U.S. PATENT DOCUMENTS

| | | | | |
|---|---|---|---|---|
| 4,103,788 A | * | 8/1978 | Sutton | B65G 65/466 198/661 |
| 4,253,244 A | * | 3/1981 | Kranzler | F26B 25/22 34/233 |
| 9,005,537 B1 | * | 4/2015 | Cudahy | B01J 19/004 422/187 |
| 9,015,958 B2 | | 4/2015 | Bloemendaal | |
| 2003/0143324 A1 | * | 7/2003 | Delzer | A61F 13/15658 427/180 |
| 2004/0120804 A1 | * | 6/2004 | Sabini | F04D 15/0088 415/118 |
| 2008/0304945 A1 | * | 12/2008 | Hlinka | B65G 43/02 414/307 |
| 2010/0200089 A1 | | 8/2010 | Fleshner | |

(Continued)

OTHER PUBLICATIONS

"Single to Three Phase Conversion for Grain Bins Dryers and Air Transfer Systems", [Online]. Retrieved from the Internet: <URL:http://farmvfds.com/2016/grain2016.htm>, (2016), 6 pgs.

*Primary Examiner* — Rocio Del Mar Perez-Velez
*Assistant Examiner* — Alicia M. Choi
(74) *Attorney, Agent, or Firm* — Schwegman Lundberg & Woessner, P.A.

(57) ABSTRACT

A control system for controlling a shared variable frequency drive for operating more than one mechanical systems of a grain bin. The control system includes at least one processor circuit that is configured to operate the shared VFD in both a first mode, wherein operating in the first mode results in operating a fan assembly of the grain bin, and a second mode, wherein operating in the second mode results in operating an unload sweep assembly within the grain bin.

19 Claims, 7 Drawing Sheets

(56) References Cited

U.S. PATENT DOCUMENTS

| | | |
|---|---|---|
| 2010/0234984 A1 | 9/2010 | Luster et al. |
| 2011/0018472 A1* | 1/2011 | Rockenfeller ............ H02P 5/74 |
| | | 318/51 |
| 2012/0011922 A1 | 1/2012 | Bowsher |
| 2012/0265369 A1 | 10/2012 | Knight et al. |
| 2013/0115031 A1 | 5/2013 | Trame et al. |
| 2014/0250717 A1* | 9/2014 | Bloemendaal ............ F26B 3/06 |
| | | 34/487 |
| 2014/0360045 A1* | 12/2014 | Bartosik ................ F26B 21/08 |
| | | 34/474 |
| 2015/0345863 A1 | 12/2015 | O'Gary |
| 2015/0354895 A1* | 12/2015 | Bloemendaal ............ F26B 3/06 |
| | | 34/495 |
| 2016/0006379 A1* | 1/2016 | Wang ................ F04D 15/0066 |
| | | 318/5 |
| 2016/0069624 A1* | 3/2016 | Rollins ................ F04D 25/028 |
| | | 415/122.1 |
| 2016/0281484 A1* | 9/2016 | Lestz ........................ C09K 8/60 |
| 2016/0345501 A1* | 12/2016 | Baert .................... A01F 12/448 |
| 2017/0021318 A1* | 1/2017 | McIver .................. B60P 1/483 |
| 2017/0126164 A1* | 5/2017 | Gibbs .................... H02P 27/04 |
| 2018/0058463 A1* | 3/2018 | Rollins ............... F04D 25/0606 |

\* cited by examiner

CONTROL SYSTEM FOR OPERATING GRAIN BIN SYSTEMS

TECHNICAL FIELD

This document pertains generally, but not by way of limitation, to grain bins. More particularly, this disclosure relates to control systems, and methodologies for operating grain bin systems.

BACKGROUND

Grain bins have been used to store grain for many years. In a typical grain bin multiple mechanical and electrical based systems are present to store, move, monitor, and maintain the grain. As an example, an unload sweep assembly is provided that has a numerous augers that rotate in order to convey the grain within the bin. Other systems include fan assemblies, heating assemblies, temperature monitoring assemblies, and the like.

Each system functions to either access or move grain within the bin, to heat, cool, or dry grain, or to monitor different characteristics of the grain within the bin. In all, the systems facilitate grain related activities, such as minimizing handling of grain, maintaining the quality of the grain, and preventing grain related problems.

OVERVIEW

The mechanical systems within a grain bin operate using single phase power with individual systems having their own control systems to operate the motor of an assembly. As an example, the unload sweep assembly has a control system that operates a single-phase motor of the sweep assembly at a constant torque load, but variable speed. A user interface is provided to operate a controller to actuate the unload sweep system to rotate the augers. This controller is an analog device that operates the unload sweep assembly in a range between 3 and 7.5 horse power (Hp).

In an example, the fan assembly also has its own separate controller operating the fan assembly with a single phase motor. The fan assembly can include an axial fan, centrifugal fan, or the like to convey and circulate air within the grain bin. The fan assembly controller has an analog output and provides variable speed and torque control of the fan motor. Depending on the setting, a fan assembly can operate in a range between 5 Hp and 10 Hp.

A heating device, such as a gas heater can be part of the fan assembly. When grain is wet and needs drying, or when the temperature outside the grain bin drops, the heater heats the air such that the fan device of a fan assembly conveys hot air into the grain bin. Great care must be taken by individuals operating the fan assembly to ensure the fan assembly is blowing hot air from the heating device into the grain bin. Otherwise, the heated air remains at the heating device. This can result in overheating of the heating device, overheating of grain, or the like.

Provided is a grain bin that can utilize three-phase power for systems within the grain bin, including the unload sweep assembly and fan assembly. The system can include a shared variable frequency drive (VFD) that couples to such three-phase systems and can provide digital control of the individual systems. The shared VFD can operate in different modes that can present variable or constant torque load such as needed and different horse power such as needed. The system can also present lockout and interlocking features such as to inhibit or prevent error in operation of the individual systems by the single VFD. Thus, the systems can be controlled with a single control unit, providing improved functionality, reduced maintenance, while also preventing misuse.

This Overview is intended to provide non-limiting examples of the present subject matter—it is not intended to provide an exclusive or exhaustive explanation. The Detailed Description below is included to provide further information about the present apparatuses and methods.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
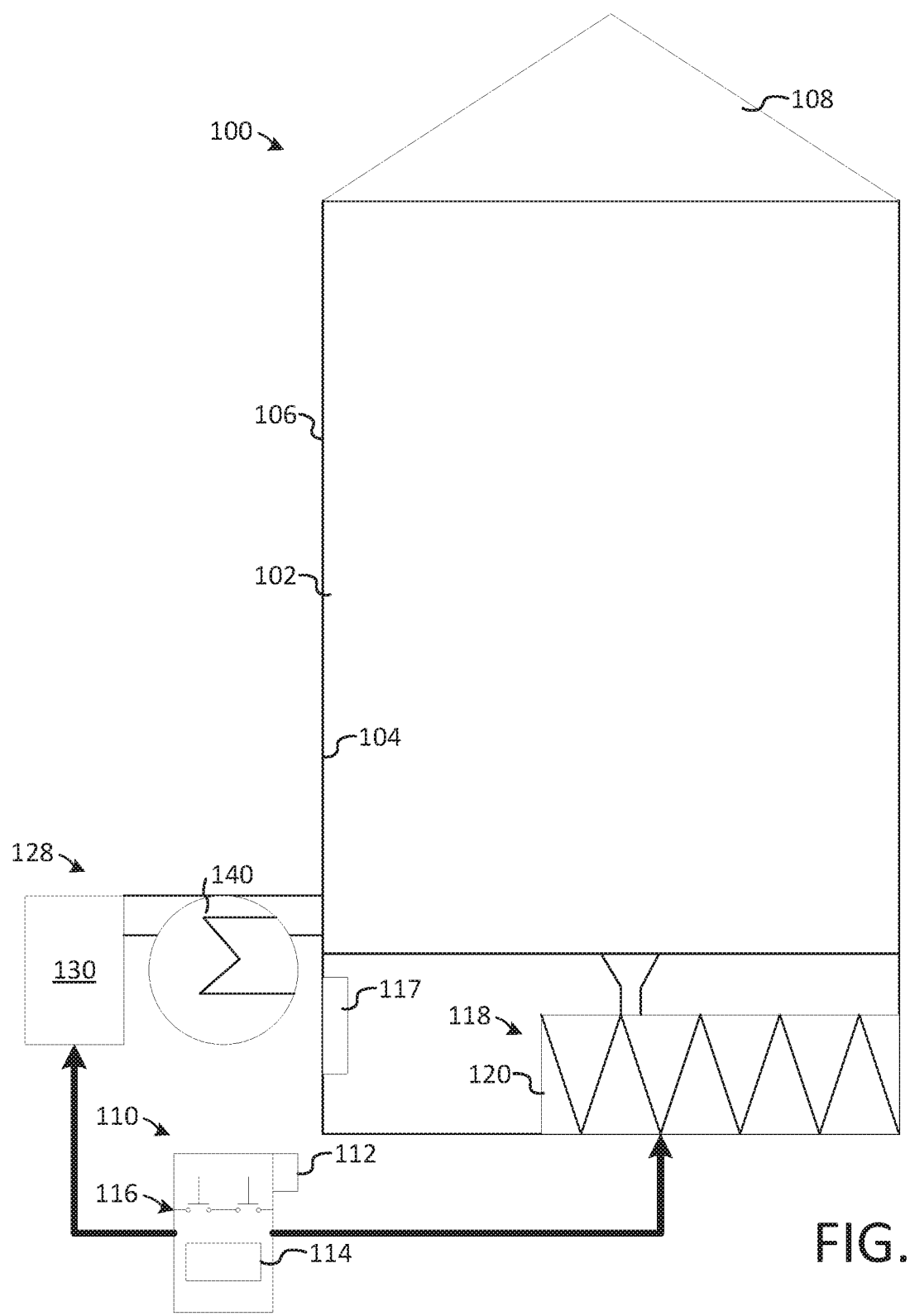
FIG. 1 is a schematic diagram of a grain bin.

FIG. 1 illustrates a grain bin 100, such as having a generally cylindrical housing 102 with an interior 104 and exterior 106. The housing can be made of corrugated steel and can include a roof 108. While not shown in detail, the housing 102 also can present any standard features including but not limited to a grain bin door, vents, relief panels, or the like.

In FIG. 1, a control system 110 can operate a shared variable frequency drive 112 (VFD) that can be configured to control or actuate at least two mechanical systems of the grain bin. For example, the control system 110 can include a programmable logic controller (PLC) capable of digital control of the mechanical systems. The control system 110 can include a user or other interface 114 and one or more inputs 116 such as to allow an operator to control the mechanical systems within the grain bin. The interface 114 can include a touch screen that can allow an operator to provide input directly through the interface 114, such as without using the inputs 116. The inputs 116 can include push buttons, such as with each button causing operation of a separate system. The inputs can include keys on a keyboard or can include a mouse.

The control system 110 can be coupled directly to the shared VFD 112 or to a mechanical system. The control system 110 can be remotely mounted from the shared VFD 112 and mechanical systems, such as to the grain bin housing 102, in the grain bin interior 104, spaced from the grain bin exterior 106, or otherwise. As a result of remote mounting, the control system 110 is located in a convenient location for control of the different mechanical systems. The interface 114 of the control system 110 and shared VFD 112 can be located within environmentally controlled panels 117 mounted on the housing 102 of the grain bin 100. The panels 117 can be provided with heating or cooling controls such as can help ensure that the interface 114 and VFD 112 operate within respective desired temperature ranges.

The shared VFD 112 is of any type that is a single VFD coupled to and driving more than one mechanical system. While the figures show generally two mechanical systems coupled to the VFD, the VFD can provide outputs for numerous mechanical systems, including three or more. The VFD shown operates to prevent concurrent driving of the mechanical systems. In other embodiments, concurrent driving of multiple systems is allowed while concurrent driving of other multiple systems is prevented. As an example, the VFD can prevent concurrent operation of a fan assembly and unload sweep assembly while allowing operation of the fan assembly and a cooling system.

The shared VFD 112 can drive a first mechanical system that operates at a variable speed with a variable torque load, and also operate a system providing variable speed with a constant torque load. Alternatively, the VFD can drive a first mechanical system at a constant speed and variable torque load while driving a second mechanical system at a variable speed and constant torque load. Additionally, the differing mechanical systems can have differing horse powers, speeds, and torque loads. Specifically, as a result of converting to three phase wiring, the VFD is able to receive 230V to provide operating limits in a range between 0-30 Hp for the mechanical systems. Consequently, the VFD 112 provides mechanical systems with variable voltage and frequency as required by the motors within the mechanical systems dependent on the input channel as controlled by the control system 110. Thus, based on the selection of the channel, or terminal, of the VFD 112 for the mechanical system, mechanical systems with varying motor speed, torque loads, and horse power requirements can be coupled to the VFD and operated.

In one example, a mechanical system coupled to and operated by the shared VFD 112 can include an unload sweep assembly 118. The unload sweep assembly 118 can include at least one auger arm element 120 that can rotate such as to convey grain to an unload device. The at least one auger arm element 120 can be rotated by an unload sweep motor 124 such as can rotate the sweep assembly 118 at a constant torque load such as can have an operating power in a range between 3 and 7.5 Hp. The unload sweep motor 124 (FIG. 2) operates using three phase power such as in a range between 0 and 30 Hp at 230 Volts (V).

Figure 3:
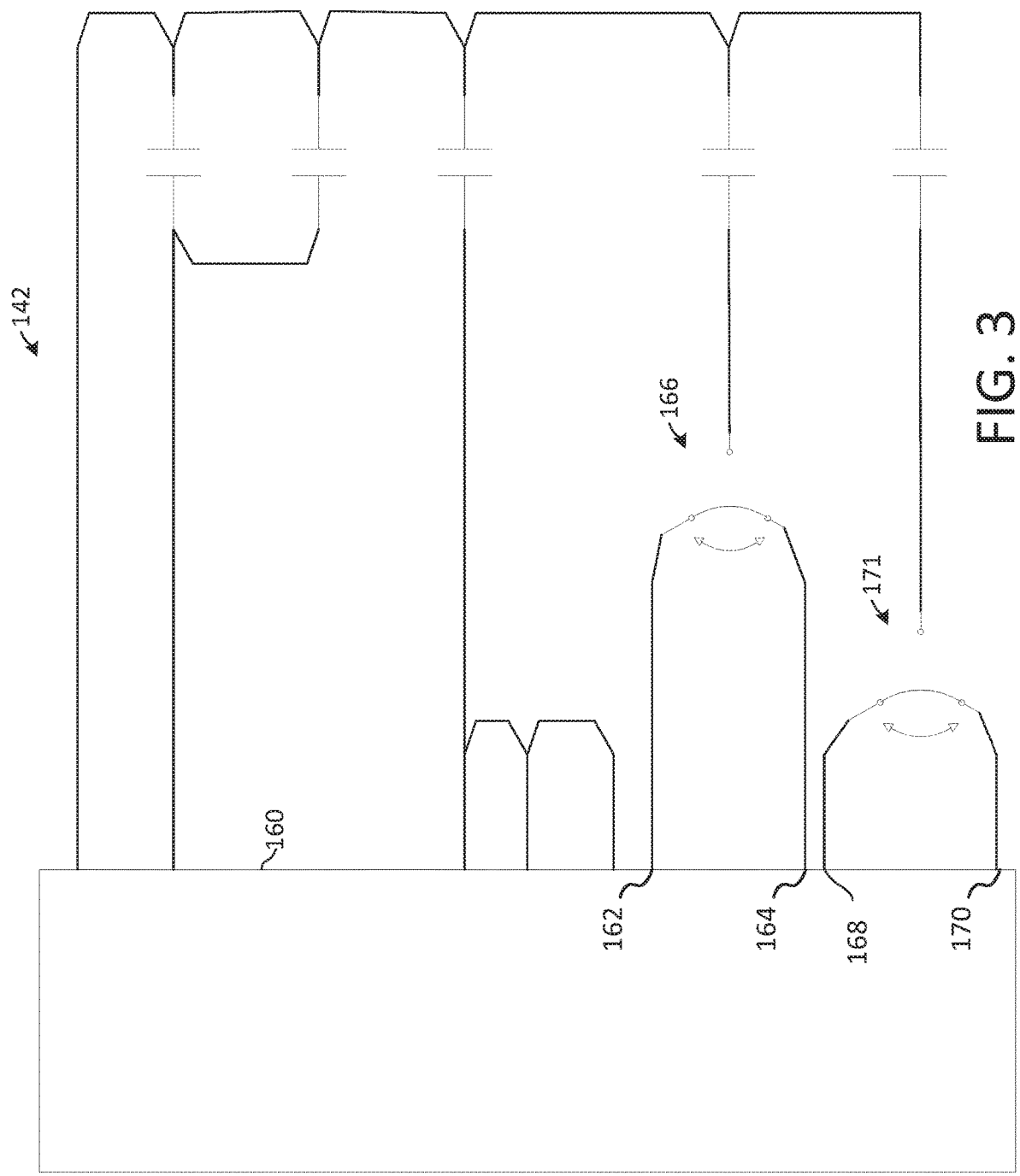
FIG. 3 is a schematic diagram of a portion of control circuitry.

In an example, an unload sweep control station 126 (FIG. 4) is part of the shared VFD 112, such as for start and stop control using the shared VFD 112. The shared VFD 112 provides digital signals such as to avoid interference susceptibility of analog signals. In an example, the shared VFD, when controlling the unload sweep assembly 118, operates in a range between 10 Hz and 60 Hz. Thus, when controlling the unload sweep assembly 118 the shared VFD provides settings associated with input terminals (FIG. 3) such as can include a setting that increases speed and a setting that decreases speed. The input terminals can increase or decrease the shared VFD output frequency, such as based on acceleration or deceleration ramp curves. In an example, the shared VFD increases or decreases speed in response to operation of a speed controller or speed selector switch (FIG. 3). For example, the speed selector switch can include a three-position spring return select switch that can be held by a user in a position to increase or decrease speed of unload sweep assembly. Once released, the switch returns to a neutral position and the shared VFD maintains the speed setting. Thus, based on a speed ramp curve, such as a digital speed ramp curve, the speed of the unload sweep assembly can be varied, such as from 0%-100% of the available operating speeds.

Another mechanical system coupled to and operated by the shared VFD 112 is a fan assembly 128. The fan assembly 128 includes a fan device 130 that is in communication with the interior 104 of the grain bin housing 102. The fan device 130 can be any fan type, including but not limited to, an axial fan, centrifugal fan, or the like. In an embodiment, the fan device 130 is secured to the exterior 106 of the housing 102 and intakes air from outside the housing to convey the air into the interior 104 of the housing 102. In an embodiment, the fan device 130 is positioned within the housing 102, such as to recirculate air from within the housing 102.

The fan assembly 128 also includes a fan motor 132 (FIG. 2) that rotates a blade of the fan device 130. The fan motor 132 is operated using three phase power and operates at variable torque loads. The fan motor 132 can include or be controlled by a speed control, or three-position switch (FIG. 3) such as to operate at three separate speeds, low, medium, and high, such as depending on the input frequency to the fan motor 132. For example, when the three-position switch is in a first or low position, a 24 vdc signal can be sent to a shared VFD input terminal, such as to cause operation of the fan motor 132 at 30 Hz. When the three-position switch is in a second or medium position, a default reference speed of the shared VFD 112 is utilized, such as providing operation of the fan motor 132 at 45 Hz. When the three-position switch is in a third or high position, the 24 vdc signal is sent to the shared VFD input terminal, such as to cause operation of the fan motor 132 at 60 Hz.

The fan assembly 128 can also include a heating device 140 coupled to the fan device 130 and shared VFD 112. In an example, the heating device 140 is a gas heater. When the heating device 140 is heating, the air conveyed from the fan assembly 128 to the grain bin 100 passes through the heating device 140 such as to convey heated air from the heating device 140 to the interior 104 of the grain bin 100. The heating device 140 is coupled to the fan assembly 128 such that the heating device does not operate to heat until the fan assembly reaches a threshold frequency input. In an embodiment, that threshold frequency input is 25 Hz. This prevents heating operation of the heating device 140 without the fan device also operating to convey the heat generated by the heating device 140 into the grain bin, such as to minimize the likelihood of the heating device 140 overheating.

Figure 2:
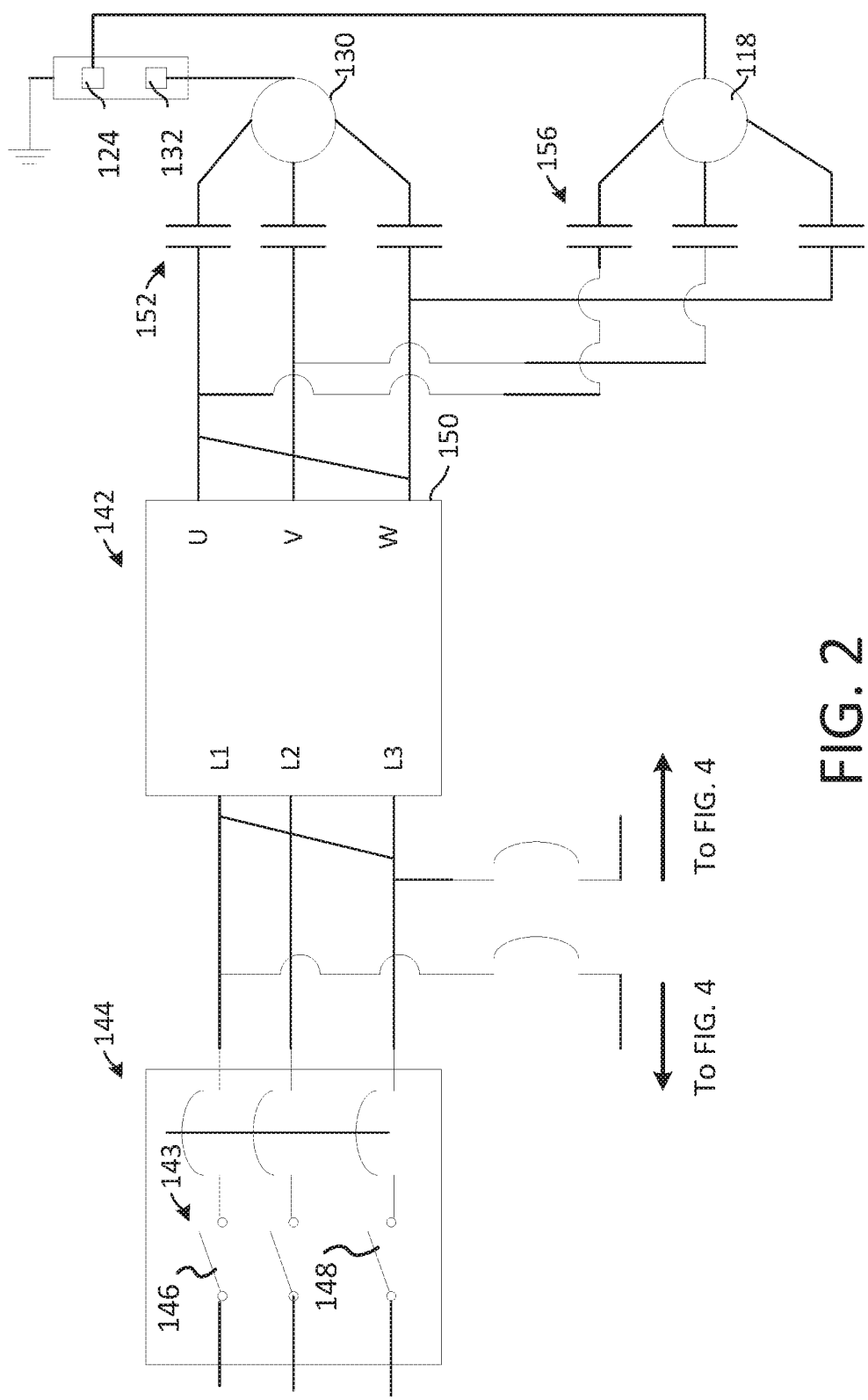
FIG. 2 is a schematic diagram of a portion of control circuitry.
Figure 4:
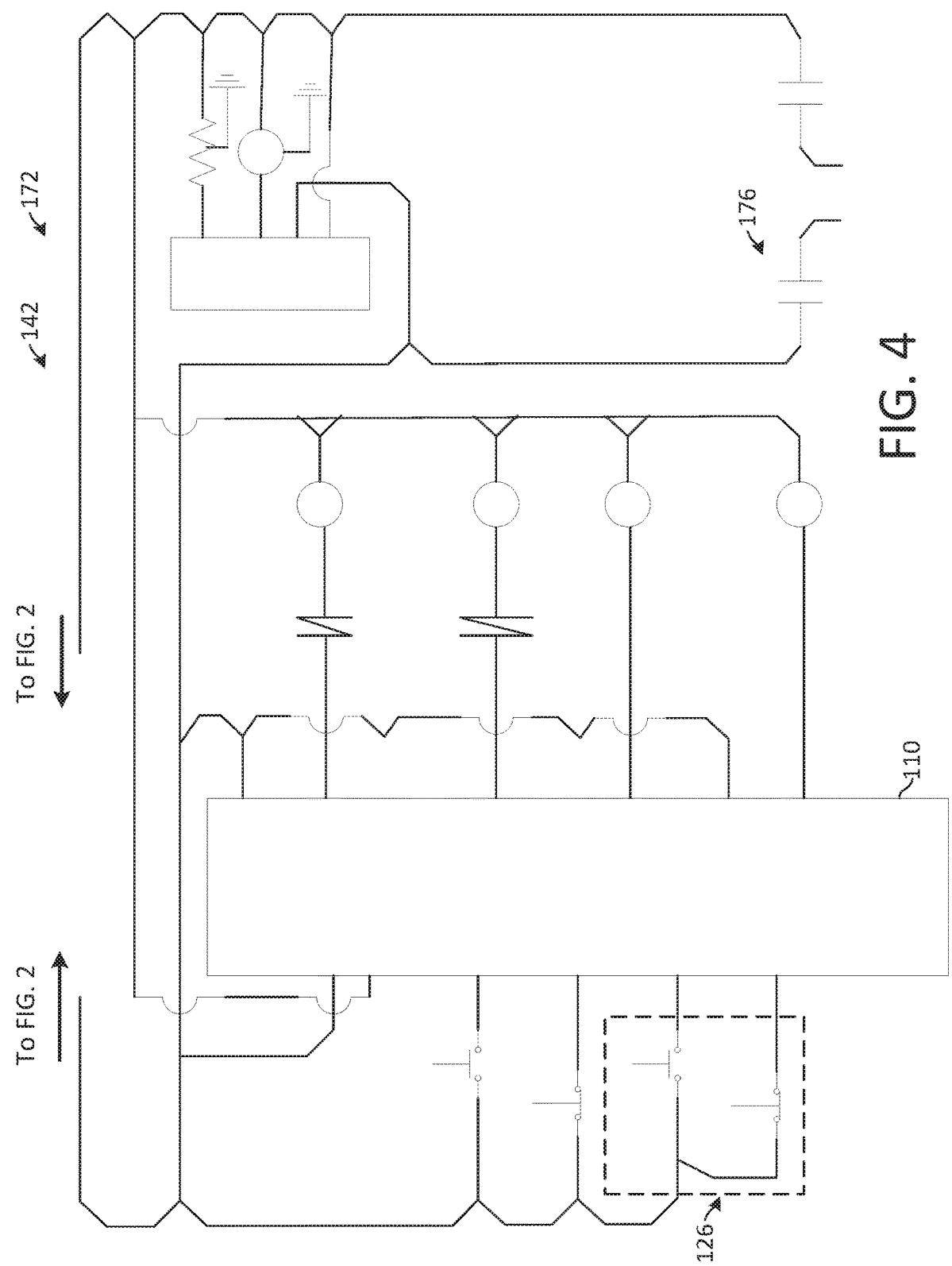
FIG. 4 is a schematic diagram of a portion of control circuitry.

FIGS. 2-4 illustrate schematic diagrams of control circuitry 142 of the control system 110 and shared VFD 112. In an example, the control system 110 is a PLC with inputs 116 that are push buttons that operate switch devices 143 that can be included in a lockout circuit 144. The lockout circuit 144 prevents operation of the system 110 in more than one mode. When a first push button is depressed, the connection of a first switch element 146 occurs, causing operation in the first mode. In an example, operation of the shared VFD 112 in the first mode includes controlling or actuating the fan assembly 128, including speed control.

After connecting the first switch element 146, the PLC circuitry logic controls the lockout circuit 144 such that the second switch element 148 must be disconnected, preventing operation in the second mode. Specifically, if a user depresses a second push button, the PLC circuitry logic causes the PLC to scan or determine if the VFD is already operating in a mode, such as the first mode. If the circuitry logic determines operation in a different mode is occurring, the circuitry logic causes the PLC to display a fault message at the interface 114 to alert the user of the operation in the other operating mode.

When the second push button is depressed and the system 110 is not operating in another mode, the control logic causes the PLC to send a signal to connect the second switch element 148 causing operation in the second mode. In an example, operation of the shared VFD 112 in the second mode includes controlling or actuating the unload sweep assembly 118, including speed control. Additionally, by connecting the second switch element 148, the PLC circuitry logic similarly controls the lockout circuit 144 such that the first switch element 146 must be disconnected, preventing operation in the first mode in the same manner as described. In this manner, the PLC circuitry provides an intermode lockout that prevents concurrent operation in both the first and second mode.

A shared VFD power connector 150 of the shared VFD 112 is coupled to the lockout circuit 144 to operate based on the operating mode selected using the inputs 116. The power connector 150 is coupled to fan contactors 152, or switches of the fan assembly 128 to power the fan motor 132. The connector 150 is also coupled to the unload sweep contactors 156, or switches of the unload sweep assembly 118 to power the unload sweep motor 124.

In one example the coils of the fan contactors 152 and unload sweep contactors 156 are electrically interlocked such that if one contactor 152, 156 is active, an open connection is caused in the coils of the other contactors 152, 156 to prevent activation of the other contactors 152, 156. In this manner, the circuitry 142 illustrates an electrical interlocking feature. Additionally, or alternatively, a mechanical interlocking feature can be provided by placing a mechanical lever between the contactors to prevent concurrent connection between the fan contactors 152 and the unload sweep contactors 156. In this manner, three separate interlocks can be provided to prevent the concurrent operation of the control system 110 in both a first mode, such as when the fan assembly operates, and a second mode, such as when the unload sweep assembly operates.

FIG. 3 illustrates a shared VFD control connector 160 that is included as part of the control circuitry 142. The control connector 160 includes a plurality of channels or terminals to provide variable speed settings in each operating mode. In this example, a first fan speed terminal 162 is programmed to operate the fan motor 132 at a low speed, or at a frequency of 30 Hz while a second fan speed terminal 164 is programmed to operate the fan motor 132 at a high speed, or at a frequency of 60 Hz. During operation, a speed controller 166 such as a three-position switch is coupled to both terminals 162 and 164. Thus, a keypad reference speed of operating the fan motor 132 can be set at a reference frequency such as 45 Hz when not operating at the low or high-speed setting. In this manner, digital set points are utilized to operate the fan device 130 at variable speeds and variable torque loads when operated in a range between 5-10 Hp.

Similarly, the shared VFD control connector 160 also has a first unload sweep speed terminal 168 and a second unload sweep speed terminal 170 coupled to a speed controller 171 such as a three-position switch. In an example, when the three-position switch is held in a first position the first unload sweep terminal 168 causes the speed of the unload sweep assembly to increase utilizing an acceleration ramp curve, that in an example is a digital ramp curve. When the three-position switch is held in a second position the second unload sweep terminal 170 causes the speed of the unload sweep assembly to decrease utilizing a deceleration ramp curve, that in an example is a digital ramp curve. When the three-position switch is in a third neutral position, the speed of the unload sweep assembly remains constant. In this manner, the unload sweep assembly provides variable speed control from 0%-100% of speeds at a constant torque load while operating in a range between 3-7.5 Hp. Consequently, the shared VFD 112 operates the fan assembly 128 and unload sweep assembly 118 at varying speeds with differing horse powers and with one assembly providing a constant torque load and the other providing a variable torque load.

FIG. 4 illustrates a heat interlock 172 within the control circuitry 142 and coupled to the fan assembly 128. The heat interlock 172 is coupled between the fan assembly 128 and the heating device 140. Specifically, the control system 110 disconnects power to a heater relay 176 when the fan assembly 128 is not blowing. The heater connection is coupled to the controller such that the frequency of the first and second fan speed terminals 162, 164 are monitored to determine when the fan motor reaches a threshold frequency. In one example the threshold frequency is 25 Hz. Once the threshold frequency is reached, the heater relay 176 is programmed to connect to activate the heating device 140. Thus, the heating device 140 is unable to start until the fan assembly 128 is operating, with such interlocking preventing overheating at the heating device and resulting detrimental effects.

Figure 5:
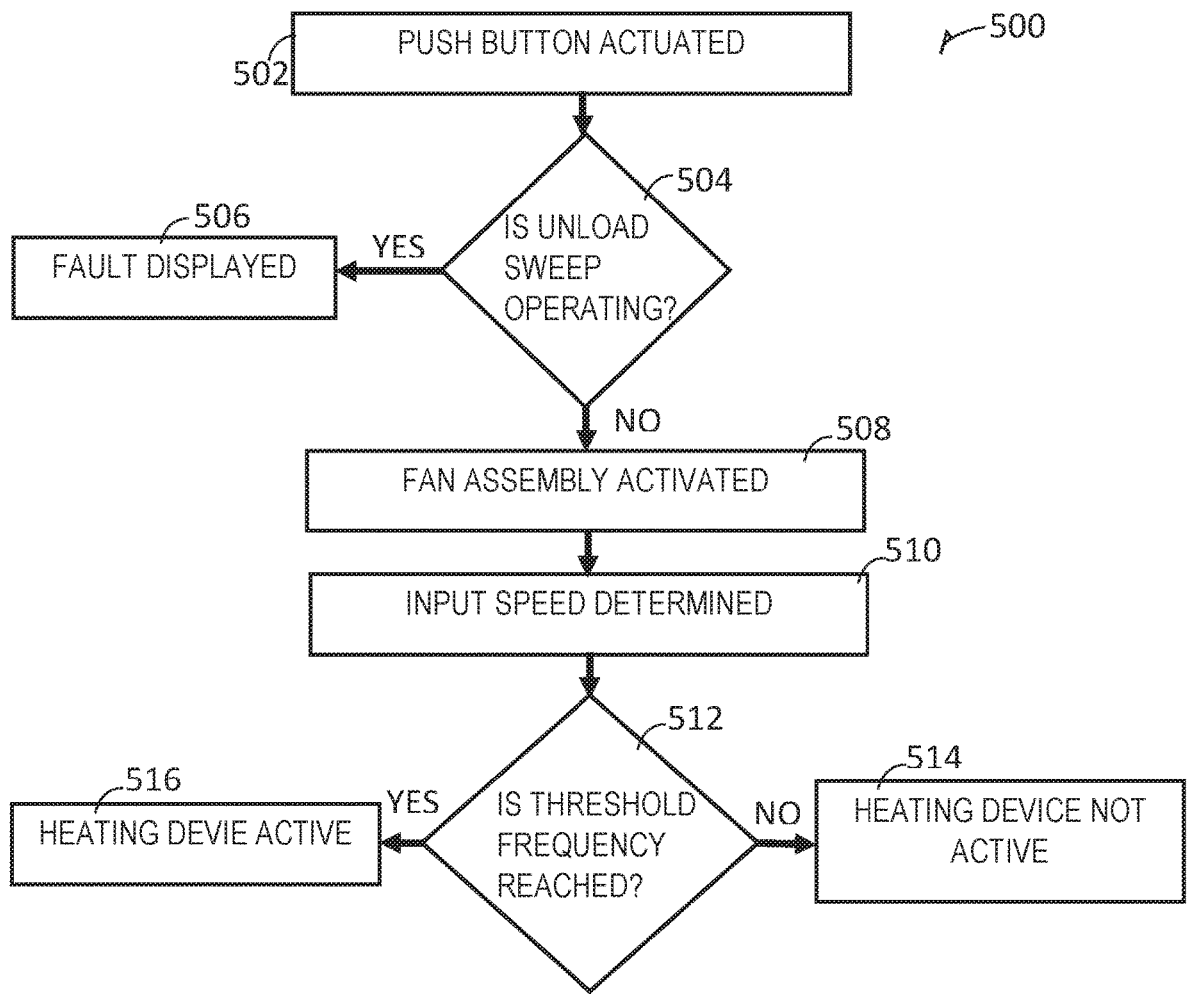
FIG. 5 is a block flow diagram of a method of operating a control system.

FIG. 5 illustrates a flow block diagram of a method of operating a control system to operate a fan assembly at a set speed 500. In the method, the power to the control system is on. At 502, a user depresses a push button to turn on a fan assembly. At decision 504, a determination is made whether the unload sweep assembly is operating. At 506, if the unload sweep assembly is operating, a fault state is displayed. At 508, if the unload sweep assembly is not operating, the fan assembly is activated. At 510, a fan speed is determined. If a low speed is desired, the shared VFD operates the fan motor at a frequency of 30 Hz. If a medium speed is desired the shared VFD operates the fan motor at a frequency of 45 Hz. If high speed is desired the shared VFD operates the fan motor at a frequency of 60 Hz. At 512, a decision is made regarding if the fan assembly is operating at a threshold frequency. If the fan assembly is not operating at the threshold frequency, at 514, a heating device cannot receive power for activation. At 516, if the fan assembly is operating above the threshold frequency, the heating device is activated for operation.

Figure 6:
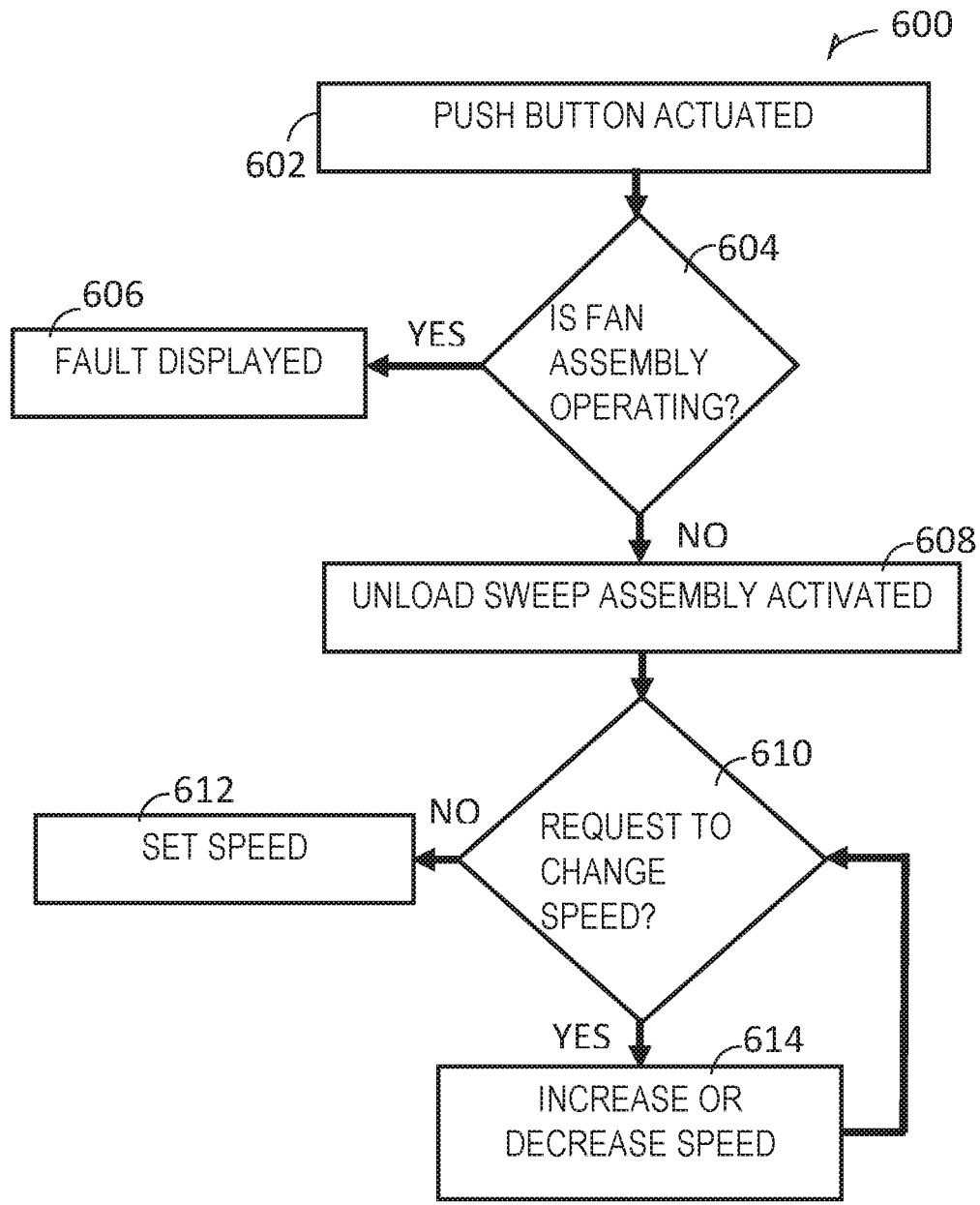
FIG. 6 is a block flow diagram of a method of operating a control system.

FIG. 6 illustrates a flow block diagram of a method of operating a control system to operate a unload sweep assembly 600. Again, in this method, the power to the control system is on. At 602, a user depresses a push button to turn on a fan assembly. At decision 604, a determination is made whether the fan assembly is operating. At 606, if the fan assembly is operating, a fault state is displayed. At 608, if the fan assembly is not operating, the unload sweep assembly is activated. At 610 a decision is made regarding whether a request is being made to increase or decrease speed. At 612, if no request is made, the unload sweep assembly operates as a constant speed. At 614, if a request to increase or decrease speed is made, a speed ramp, such as a digital speed ramp is utilized to increase the speed defined by the speed ramp until and a decision is again made regarding whether a request to increase or decrease speed is presented. Thus, until, the request is no longer made, speed continues to increase or decrease until a maximum or minimum speed is reached.

Thus provided is a control system 110 using a shared VFD that converts single phase power to three phase power, allowing motor loads up to 30 Hp and 230V. The system 110 interlocks the heating device 140 to prevent operation of the heating device prior to activation of a fan assembly 128. The control system 110 and shared VFD are able to mount on the fan assembly, or remotely, providing flexibility in use. The system 110 allows for alternating use in two separate modes. This includes a first mode when the unload sweep is operated and a second mode when the fan assembly is operated. By utilizing the shared VFD 112, the need for multiple VFDs is eliminated reducing overall costs.

Also provided with the shared VFD 112 is independent speed control in multiple operating modes. Thus, an unload sweep assembly can be operated from 0%-100% variable speeds using digital signals. Specifically, ramp curves are utilized to increase and decrease the speed of the unload sweep assembly. Meanwhile, the shared VFD 112 can also operate the fan assembly 128 at set points such as low, medium, and high, with each presenting differing frequency outputs to increase or decrease the speed of the fan assembly 128. Thus, independent speed control is presented, and by utilizing digital signals, instead of analog signals, interference created by the grain bin is also minimized.

Finally, the control system 110, and the control circuitry 142 provide multiple safety interlocking systems to prevent simultaneous operation of the unload sweep assembly and fan assembly. Similarly, operation of the heating device only occurs when the fan assembly reaches a threshold frequency. Consequently, dangerous operations of the system are prevented and an improved control system for a grain bin is provided.

Figure 7:
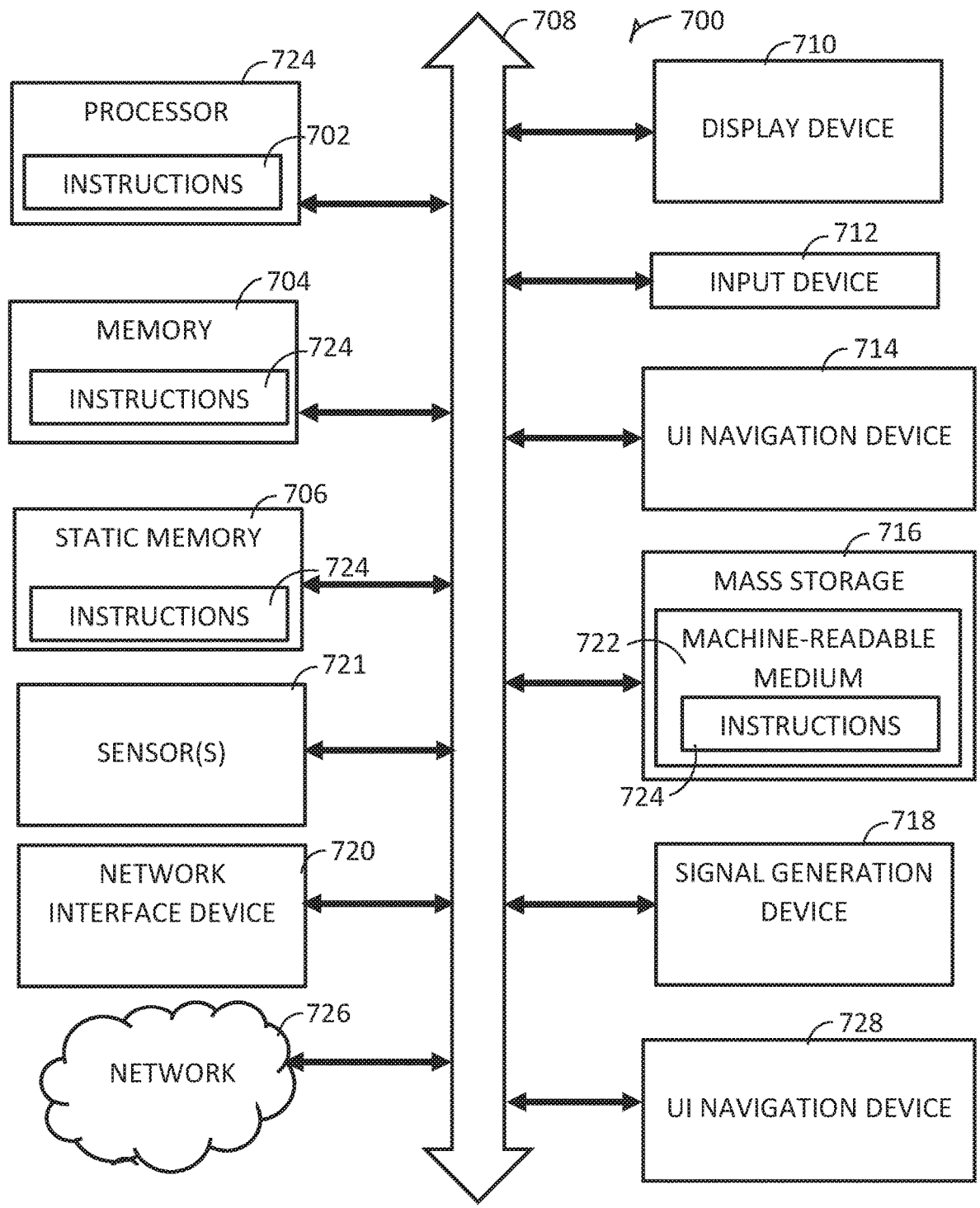
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. The machine 700 includes, but is not limited to, the control system 110 of FIGS. 2-4. Thus, in the manners described in relation to the block diagram of FIG. 7, the control system is a machine 700 utilizing at least the control circuitry 142 described in relation to FIGS. 2-4 to vary modes of the control system, including between a first mode and a second mode, and providing power to drive individual mechanical systems.

In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, engines, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. The circuitry includes in examples at least one processor circuit that includes in part the control circuitry 142. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU) including the CPU of a PLC of control system 110, a graphics processing unit (GPU), a hardware processor core, or any combination thereof), a main memory 704 and a static memory 706, some or all of which may communicate with each other via an interlink (e.g., bus) 708. The processor 702 in one example includes at least one processor circuit that is configured to operate the shared VFD 112 in different operating modes including first and second operating modes as described. The at least one processor circuit can include at least in part the control circuitry 142. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

VARIOUS NOTES & EXAMPLES

Example 1 is a control system for controlling a shared variable frequency drive (VFD) for operating more than one mechanical systems of a grain bin, the control system comprising: at least one processor circuit that can be configured to: operate the shared VFD in a first mode, wherein operating in the first mode comprises operating a fan assembly of the grain bin; and operate the shared VFD in a second mode, wherein operating in the second mode comprises operating an unload sweep assembly within the grain bin.

In Example 2, the subject matter of Example 1 optionally includes wherein operating the shared VFD in the first mode further comprises: actuating a heating device while operating the fan assembly.

In Example 3, the subject matter of Example 2 optionally includes wherein operating in the first mode further comprises: inhibiting operation of the heating device until reaching a threshold frequency of the fan assembly.

In Example 4, the subject matter of any one or more of Examples 2-3 optionally include wherein the heating device can be a gas heater and the shared VFD operates to interlock the gas heater to inhibit operation of the gas heater until reaching a threshold frequency of the fan assembly.

In Example 5, the subject matter of any one or more of Examples 1-4 optionally include wherein the shared VFD operates the fan assembly presenting a variable torque load.

In Example 6, the subject matter of Example 5 optionally includes wherein the shared VFD operates the unload sweep assembly presenting a constant torque load.

In Example 7, the subject matter of Example 6 optionally includes wherein the variable torque load of the fan assembly has a different torque load value compared to the constant torque load of the unload sweep assembly when the VFD operates the fan assembly and unload sweep assembly.

In Example 8, the subject matter of any one or more of Examples 6-7 optionally include wherein the shared VFD operates the fan assembly at a first horse power and the VFD operates the unload sweep assembly at a second horse power; wherein the first horse power and the second horse power differ.

In Example 9, the subject matter of any one or more of Examples 1-8 optionally include wherein operating the fan assembly includes at least one of increasing or decreasing the speed of a fan motor of the fan assembly.

In Example 10, the subject matter of Example 9 optionally includes wherein the at least one of increasing or decreasing the speed can be based on digital speed set points of a speed controller coupled to the shared VFD.

In Example 11, the subject matter of any one or more of Examples 1-10 optionally include wherein the operating the unload sweep assembly includes at least one of increasing or decreasing the speed of a sweep motor of the unload sweep assembly.

In Example 12, the subject matter of Example 11 optionally includes wherein the at least one of increasing or decreasing the speed of the sweep motor can be based on at least one digital speed ramp curve provided by a speed controller coupled to the shared VFD.

In Example 13, the subject matter of Example 12 optionally includes % of the at least one digit speed ramp curve.

In Example 14, the subject matter of any one or more of Examples 1-13 optionally include wherein at least one processor circuit includes a programmable logic controller.

In Example 15, the subject matter of any one or more of Examples 1-14 optionally include wherein the shared VFD can be coupled to the fan assembly and the unload sweep assembly remote from the fan assembly and the unload sweep assembly.

In Example 16, the subject matter of any one or more of Examples 1-15 optionally include wherein the shared VFD includes input circuitry that switches the shared VFD from operating in the first mode to the second mode.

Example 17 is a method of operating one or more mechanical systems within a grain bin, the method comprising: operating a shared variable frequency drive (VFD)

in a first mode, wherein operating in the first mode comprises operating a fan assembly of the grain bin with the VFD; operating the shared VFD in a second mode, wherein operating in the second mode comprises operating an unload sweep assembly within the grain bin.

In Example 18, the subject matter of Example 17 optionally includes receiving an input from a user interface of a programmable logic controller; and operating the shared VFD in either the first mode or second mode based on the input received.

In Example 19, the subject matter of any one or more of Examples 17-18 optionally include inhibiting simultaneous operation in the first mode and mode based on one of a programmable logic controller interlock, an electrical interlock, or a mechanical interlock.

Example 20 is a method of Example 17, further comprising: increasing or decreasing a speed of one of the fan assembly or the unload sweep assembly based on digital speed set points of a speed controller coupled to the shared VFD.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The claimed invention is:

1. A control system for controlling a shared variable frequency drive (VFD) for operating more than one mechanical systems of a grain bin, the control system comprising:
    at least one processor circuit that is configured to:
        operate the shared VFD in a first mode, wherein operating in the first mode comprises controlling a fan assembly of the grain bin, and a heating device coupled to the fan assembly, the heating device providing heat only when the fan assembly is blowing and inhibiting heating of the heating device until the fan assembly reaches a threshold frequency; and
        operate the shared VFD in a second mode, wherein operating in the second mode comprises controlling an unload sweep assembly within the grain bin.

2. The control system of claim 1, wherein the heating device is a gas heater and the shared VFD operates to provide an interlock between the gas heater and the fan assembly.

3. The control system of claim 1, wherein the shared VFD operates the fan assembly presenting a variable torque load.

4. The control system of claim 3, wherein the shared VFD operates the unload sweep assembly presenting a constant torque load.

5. The control system of claim 4 wherein the variable torque load of the fan assembly has a different torque load value compared to the constant torque load of the unload sweep assembly when the VFD operates the fan assembly and unload sweep assembly.

6. The control system of claim 4 wherein the shared VFD operates the fan assembly at a first horse power and the VFD operates the unload sweep assembly at a second horse power; wherein the first horse power and the second horse power differ.

7. The control system of claim 1, wherein controlling the fan assembly includes at least one of increasing or decreasing the speed of a fan motor of the fan assembly.

8. The control system of claim 7 wherein the at least one of increasing or decreasing the speed is based on digital speed set points of a speed controller coupled to the shared VFD.

9. The control system of claim 1, wherein controlling the unload sweep assembly includes at least one of increasing or decreasing the speed of a sweep motor of the unload sweep assembly.

10. The control system of claim 9, wherein the at least one of increasing or decreasing the speed of the sweep motor is based on at least one digital speed ramp curve provided by a speed controller coupled to the shared VFD.

11. The control system of claim 10 wherein the speed controller varies the speed of the sweep motor between 0%-100% of the at least one digital speed ramp curve.

12. The control system of claim 1, wherein at least one processor circuit includes a programmable logic controller.

13. The control system of claim 1 wherein the shared VFD is coupled to the fan assembly and the unload sweep assembly, and the shared VFD is mounted at a location remote from the fan assembly and the unload sweep assembly.

14. The control system of claim 1 wherein the shared VFD includes control circuitry including a lockout circuit that prevents concurrent operation in the first mode and the second mode.

15. A method of operating one or more mechanical systems within a grain bin, the method comprising:
operating a shared variable frequency drive (VFD) in a first mode, wherein operating in the first mode comprises controlling a fan assembly of the grain bin with the shared VFD, and a heating device coupled to the fan assembly such that the heating device provides heat only when the fan assembly is blowing, and inhibiting heating by the heating device until the fan assembly reaches a threshold frequency; and
operating the shared VFD in a second mode, wherein operating in the second mode comprises controlling an unload sweep assembly within the grain bin.

16. The method of claim 15, further comprising:
receiving an input from a user interface of a programmable logic controller; and
operating the shared VFD in either the first mode or the second mode based on the input received.

17. The method of claim 15, further comprising:
inhibiting concurrent operation in the first mode and second mode based on one of a programmable logic controller lockout circuit, an electrical interlock, or a mechanical interlock.

18. A method of claim 15, further comprising:
increasing or decreasing a speed of one of the fan assembly or the unload sweep assembly based on digital speed set points or ramp curves of a speed controller coupled to the shared VFD.

19. The method of claim 15, wherein the heating device is a gas heater and the shared VFD operates to provide an interlock between the gas heater and the fan assembly.

* * * * *